(12) United States Patent
Sanders et al.

(10) Patent No.: US 6,525,155 B2
(45) Date of Patent: Feb. 25, 2003

(54) ANIONIC VINYL/DICARBOXYLIC ACID POLYMERS AND USES THEREOF

(76) Inventors: John Larry Sanders, 13101 Canterbury, Leawood, KS (US) 66209; James Michael Kimmerly, 5117 W. 131st St., Leawood, KS (US) 66209; Grigory Mazo, 1327 Central Ave., Wilmette, IL (US) 50091-2512

( * ) Notice: Subject to any disclaimer, the term of this patent is extended or adjusted under 35 U.S.C. 154(b) by 0 days.

(21) Appl. No.: 10/020,726

(22) Filed: Dec. 12, 2001

(65) Prior Publication Data

US 2002/0132949 A1 Sep. 19, 2002

Related U.S. Application Data

(62) Division of application No. 09/562,519, filed on May 1, 2000.

(51) Int. Cl.[7] .............................................. C08F 122/10
(52) U.S. Cl. ....................... 526/321; 526/266; 526/269; 526/270; 526/271; 526/314; 526/318.2; 526/318.43; 526/319; 526/325; 526/330
(58) Field of Search ................................. 526/266, 269, 526/270, 271, 314, 318, 318.2, 318.43, 319, 321, 325, 330

(56) References Cited

U.S. PATENT DOCUMENTS

| | | |
|---|---|---|
| 2,555,049 A | 5/1951 | Lyne |
| 2,625,471 A | 1/1953 | Mowry et al. |
| 2,651,886 A | 9/1953 | Mowry et al. |
| 2,652,379 A | 9/1953 | Hedrick et al. |
| 2,652,380 A | 9/1953 | Hedrick et al. |
| 2,716,094 A | 8/1955 | Morrill |
| 2,816,083 A | 12/1957 | Shearer |
| 3,077,054 A | 2/1963 | Niemeijer et al. |
| 3,268,491 A | 8/1966 | Hattori et al. |
| 3,887,480 A | 6/1975 | Rue et al. |
| 4,575,391 A | 3/1986 | DeBoodt et al. |
| 5,191,048 A | 3/1993 | Swift et al. |
| 5,264,510 A | 11/1993 | Swift et al. |
| 5,854,177 A | 12/1998 | Koskan et al. |

OTHER PUBLICATIONS

Translation—Ushakov et al.; Maleic Anhydride–Vinyl Acetate Copolymerization and Hydrolysis; Russian J. App. Chem., vol. 24, Issue 5, pp. 485–489 (1951).

Mortvedt et al.; Fertilizer Technology and Application; Chapter 3, Phosphorus Fertilizers, pp. 33–44.

*Primary Examiner*—Helen L. Pezzuto
(74) *Attorney, Agent, or Firm*—Hovey Williams LLP

(57) ABSTRACT

Biodegradable anionic polymers are disclosed which include recurring polymeric subunits preferably made up of vinylic and dicarboxylic monomers such as vinyl acetate or vinyl alcohol and maleic anhydride, itaconic anhydride or citraconic anhydride, or combinations thereof. Free radical polymerization is used in the synthesis of the polymers, which are then hydrolyzed to replace ester groups with alcohol groups. The polymers may be complexed with ions and/or mixed with fertilizers or seed to yield agriculturally useful compositions. The preferred products of the invention may be applied foliarly, to seeds, to fertilizer, or to the earth adjacent growing plants in order to enhance nutrient uptake by the plants.

10 Claims, No Drawings

ANIONIC VINYL/DICARBOXYLIC ACID POLYMERS AND USES THEREOF

RELATED APPLICATION

This is a division of application Ser. No. 09/562,519 filed May 1, 2000, allowed.

BACKGROUND OF THE INVENTION

1. Field of the Invention

The present invention is broadly concerned with novel anionic substantially biodegradable and substantially water soluble polymers and derivatives thereof which have significant utility in agricultural applications, especially plant nutrition and related areas. More particularly, the invention is concerned with such polymers, as well as methods of synthesis and use thereof, wherein the preferred polymers have significant levels of anionic groups. Additionally, the preferred polymers also include significant levels of alcohol groups. The most preferred polymers of the instant invention include recurring polymeric subunits made up of vinylic (e.g., vinyl acetate or vinyl alcohol) and dicarboxylic (e.g., maleic acid, itaconic acid, anhydrides, and other derivatives thereof) moieties. The polymers may be complexed onto ions and/or mixed with or coated with phosphate-based fertilizers to provide improved plant nutrition products.

2. Description of the Prior Art

Lignosulfonates, polyacrylates, polyaspartates and related compounds have become known to the art of agriculture as materials that facilitate nutrient absorption. All of them suffer from significant disadvantages, which decrease their utility in comparison to the art discussed herein and limit performance.

Lignosulfonates are a byproduct of paper pulping; they are derived from highly variable sources. They are subject to large, unpredictable variations in color, physical properties, and performance in application areas of interest for this invention.

Polyacrylates and polymers containing appreciable levels thereof can be prepared with good control over their composition and performance. They are stable to pH variations. However, polyacrylates have just one carboxylate per repeat unit and they suffer from a very significant limitation in use, namely that they are not biodegradable. As a result, their utility for addressing the problems remedied by the instant invention is low.

Polyaspartates are biodegradable, but are very expensive, and are not stable outside a relatively small pH range of about 7 to about 10. They usually have very high color, and incorporate amide groups, which causes difficulties in formulating them. Additionally, polyaspartates have just one carboxylate per repeat unit and are therefore not a part of the present invention.

*Russian Journal of Applied Chemistry,* 24(5):485–489 (1951) teaches the preparation of maleic anhydride-vinyl acetate copolymers in benzene and acetone with benzoyl peroxide initiators. It further discloses the addition of above copolymers to water, wherein the polymer gradually self-hydrolyzes to a complex mixture containing units of maleic acid, vinyl alcohol, vinyl acetate, lactones, free acetic acid, and other species. Deficiencies of this teaching include undesirable presence of lactone, which decreases number of dicarboxylic groups. In addition, no use for polymers is taught or suggested.

U.S. Pat. Nos. 3,268,491 and 3,887,480 teach preparation of maleic acid-vinyl acetate copolymers in water-based solutions using redox-based initiators in a certain pH range. The approaches described in these patents are highly problematic. Only redox-type initiators are claimed to be useful. A fixed pH range restricts the practice. Only a narrow range of copolymers composed exclusively from the monomers of maleic acid and vinyl acetate are taught. The process of U.S. Pat. No. 3,268,491 is deemed to be non-commercial by U.S. Pat. No. 3,887,480 which described improved processes but uses over 17% by weight of redox initiator; such processes are very wasteful, have high environmental impact, and are not cost effective.

U.S. Pat. Nos. 5,191,048 and 5,264,510 teach copolymerization of acrylic acid, maleic acid, and vinyl acetate with subsequent hydrolysis by base. Again, several important deficiencies are evident. Among these are the exclusive use of base hydrolysis and preferred embodiments of invention incorporating monocarboxylic acids. Only terpolymers are disclosed. Furthermore, the intended uses of the compositions are very restricted and in no way teach, suggest or imply utility of the enumerated and contemplated compositions for the purposes of the present invention.

It will thus be seen that the prior art fails to disclose or provide polymers which can be synthesized using a variety of monomers and techniques in order to yield end products which are substantially biodegradable, substantially water soluble, and have wide applicability for agricultural uses.

SUMMARY OF THE INVENTION

The present invention overcomes the problems outlined above and provides a new class of anionic polymers having a variety of uses, e.g., for enhancing takeup of nutrient by plants or for mixture with conventional phosphate-based fertilizers to provide an improved fertilizer product. Advantageously, the polymers are biodegradable, in that they degrade to environmentally innocuous compounds within a relatively short time (up to about 1 year) after being in intimate contact with soil. That is to say that the degradation products are compounds such as $CO_2$ and $H_2O$ or the degradation products are absorbed as food or nutrients by soil microorganisms and plants. Similarly, derivatives of the polymers and/or salts of the polymers (e.g. ammonium salt forms of the polymer) also degrade within a relatively short time, during which significant fractions of the weight of the polymer are believed to be metabolized by soil organisms.

Broadly speaking, the anionic polymers of the invention include recurring polymeric subunits made up of at least two different moieties individually and respectively taken from the group consisting of what have been denominated for ease of reference as A, B and C moieties. Thus, exemplary polymeric subunits may be AB, BA, AC, CA, ABC, BAC, CAB, or any other combination of A moieties with B and C moieties. Moreover, in a given polymer different polymeric subunits may include different types or forms of moieties, e.g., in an AB recurring polymeric unit polymer, the B moiety may be different in different units.

In detail, moiety A is of the general formula

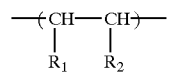

moiety B is of the general formula

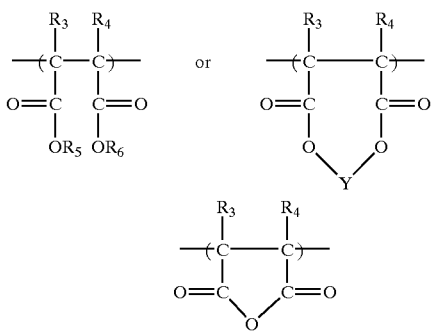

and moiety C is of the general formula

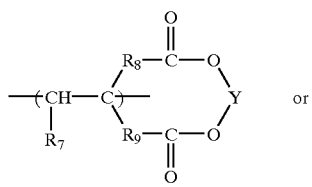

wherein $R_1$, $R_2$ and $R_7$ are individually and respectively selected from the group consisting of H, OH, $C_1$–$C_{30}$ straight, branched chain and cyclic alkyl or aryl groups, $C_1$–$C_{30}$ straight, branched chain and cyclic alkyl or aryl $C_1$–$C_{30}$ based ester groups (formate ($C_0$), acetate ($C_1$), propionate ($C_2$), butyrate ($C_3$), etc. up to $C_{30}$), $R'CO_2$ groups, and $OR'$ groups, wherein $R'$ is selected from the group consisting of $C_1$–$C_{30}$ straight, branched chain and cyclic alkyl or aryl groups; $R_3$ and $R_4$ are individually and respectively selected from the group consisting of H, $C_1$–$C_{30}$ straight, branched chain and cyclic alkyl or aryl groups; $R_5$, $R_6$, $R_{10}$ and $R_{11}$ are individually and respectively selected from the group consisting of H, the alkali metals, $NH_4$ and the $C_1$–$C_4$ alkyl ammonium groups. Y is selected from the group consisting of Fe, Mn, Mg, Zn, Cu, Ni, V, Cr, Si, B, Co, Mo, and Ca; $R_8$ and $R_9$ are individually and respectively selected from the group consisting of nothing (i.e., the groups are non-existent), $CH_2$, $C_2H_4$, and $C_3H_6$, at least one of said $R_1$, $R_2$, $R_3$ and $R_4$ is OH where said polymeric subunits are made up of A and B moieties, at least one of said $R_1$, $R_2$ and $R_7$ is OH where said polymeric subunits are made up of A and C moieties, and at least one of said $R_1$, $R_2$, $R_3$, $R_4$ and $R_7$ is OH where said polymeric subunits are made up of A, B and C moieties.

As can be appreciated, the polymers of the invention can have different sequences of recurring polymeric subunits as defined above (for example, a polymer comprising A, B and C subunits may include the one form of A moiety, all three forms of B moiety and all three forms of C moiety). In the case of the polymer made up of A and B moieties, $R_1$–$R_4$ are respectively and individually selected from the group consisting of H, OH and $C_1$–$C_4$ straight and branched chain alkyl groups, $R_5$ and $R_6$ are individually and respectively selected from the group consisting of the alkali metals.

The most preferred polymers of the invention are made up of recurring polymeric subunits formed of A and B moieties, wherein $R_5$ and $R_6$ are individually and respectively selected from the group consisting of H, Na. K, and $NH_4$ and specifically wherein $R_1$, $R_3$ and $R_4$ are each H, $R_2$ is OH, and $R_5$ and $R_6$ are individually and respectively selected from the group consisting of H, Na, K, and $NH_4$ depending upon the specific application desired for the polymer. These preferred polymers have the generalized formula

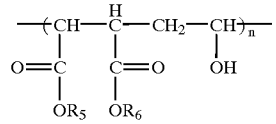

wherein $R_5$ and $R_6$ are individually and respectively selected from the group consisting of H, the alkali metals, $NH_4$ and $C_1$–$C_4$ alkyl ammonium groups (and most preferably, H, Na, K and $NH_4$ depending upon the application), and n ranges from about 1–10000 and more preferably from about 1–5000.

For purposes of the present invention, it is preferred to use dicarboxylic acids, precursors and derivatives thereof for the practice of the invention. For example, terpolymers containing mono and dicarboxylic acids with vinyl esters and vinyl alcohol are contemplated, however, polymers incorporating dicarboxylic acids were unexpectedly found to be significantly more useful for the purposes of this invention. This finding was in contrast to the conventional teachings that mixtures of mono and dicarboxylates were superior in applications previously suggested for mono-carboxylate polymers. Thus, the use of dicarboxylic acid derived polymers for agricultural applications is unprecedented and produced unexpected results. It is understood that when dicarboxylic acids are mentioned herein, various precursors and derivatives of such are contemplated and well within the scope of the present invention. Put another way, copolymers of the present invention are made up of monomers bearing at least two carboxylic groups or precursors and/or derivatives thereof. The polymers of the invention may have a wide variety of molecular weights, ranging for example from 500–5,000,000, more preferably from about 1,500–20,000, depending chiefly upon the desired end use.

In many applications, and especially for agricultural uses, the polymers of the invention may be mixed with or complexed with a metal or non-metal ion, and especially ions selected from the group consisting of Fe, Mn, Mg, Zn, Cu, Ni, Co, Mo, V, Cr, Si, B, and Ca. Alternatively, polymers containing, mixed with or complexed with such elements may be formulated using a wide variety of methods that are well known in the art of fertilizer formation. Examples of such alternative methods include, forming an aqueous solution containing molybdate and the sodium salt of polymers in accordance with the invention, forming an aqueous solution which contains a zinc complex of polymers in accordance with the present invention and sodium molybdate, and combinations of such methods. In these examples, the presence of the polymer in soil adjacent growing plants would be expected to enhance the availability of these elements to these growing plants. In the case of Si and B, the element would merely be mixed with the polymer rather than having a coordinate metal complex formation. However, in these cases, the availability of these ions would be increased for uptake by growing plants and will be termed "complexed" for purposes of this application.

The polymers hereof (with or without complexed ions) may be used directly as plant growth enhancers. For example, such polymers may be dispersed in a liquid aqueous medium and applied foliarly to plant leaves or applied to the earth adjacent growing plants. It has been found that the polymers increase the plant's uptake of both polymer-borne metal nutrients and ambient non-polymer nutrients found in adjacent soil. In such uses, plant growth-enhancing amounts of compositions comprising the above-defined polymers are employed, either in liquid dispersions or in dried, granular form. Thus, application of polymer alone results in improved plant growth characteristics, presumably by increasing the availability of naturally occurring ambient nutrients. Typically, the polymers are applied at a level of from about 0.001 to about 100 lbs. polymer per acre of growing plants, and more preferably from about 0.005 to about 50 lbs. polymer per acre, and still more preferably from about 0.01 to about 2 lbs.

In other preferred uses, the polymers may be used to form composite products where the polymers are in intimate contact with fertilizer products including but not limited to phosphate-based fertilizers such as monoammonium phosphate (MAP), diammonium phosphate (DAP), any one of a number of well known N-P-K fertilizer products, and/or fertilizers containing nitrogen materials such as ammonia (anhydrous or aqueous), ammonium nitrate, ammonium sulfate, urea, ammonium phosphates, sodium nitrate, calcium nitrate, potassium nitrate, nitrate of soda, urea formaldehyde, metal (e.g. zinc, iron) ammonium phosphates; phosphorous materials such as calcium phosphates (normal phosphate and super phosphate), ammonium phosphate, ammoniated super phosphate, phosphoric acid, superphosphoric acid, basic slag, rock phosphate, colloidal phosphate, bone phosphate; potassium materials such as potassium chloride, potassium sulfate, potassium nitrate, potassium phosphate, potassium hydroxide, potassium carbonate; calcium materials, such as calcium sulfate, calcium carbonate, calcium nitrate; magnesium materials, such as magnesium carbonate, magnesium oxide, magnesium sulfate, magnesium hydroxide; sulfur materials such as ammonium sulfate, sulfates of other fertilizers discussed herein, ammonium thiosulfate, elemental sulfur (either alone or included with or coated on other fertilizers); micronutrients such as Zn, Mn, Cu, Fe, and other micronutrients discussed herein; oxides, sulfates, chlorides, and chelates of such micronutrients (e.g., zinc oxide, zinc sulfate and zinc chloride); such chelates sequestered onto other carriers such as EDTA; boron materials such as boric acid, sodium borate or calcium borate; and molybdenum materials such as sodium molybdate. As known in the art, these fertilizer products can exist as dry powders/granules or as water solutions.

In such contexts, the polymers may be co-ground with the fertilizer products, applied as a surface coating to the fertilizer products, or otherwise thoroughly mixed with the fertilizer products. Preferably, in such combined fertilizer/polymer compositions, the fertilizer is in the form of particles having an average diameter of from about powder size (less than 0.001 cm) to about 10 cm, more preferably from about 0.1 cm to about 2 cm, and still more preferably from about 0.15 cm to about 0.3 cm. The polymer is present in such combined products at a level of from about 0.001 g to about 20 g polymer per 100 g phosphate-based fertilizer, more preferably from about 0.1 g to about 10 g polymer per 100 g phosphate-based fertilizer, and still more preferably from about 0.5 g to about 2 g polymer per 100 g phosphate-based fertilizer. Again, the polymeric fraction of such combined products may include the polymers defined above, or such polymers complexed with the aforementioned ions. In the case of the combined fertilizer/polymer products, the combined product is applied at a level so that the polymer fraction is applied at a level of from about 0.001 to about 20 lbs. polymer per acre of growing plants, more preferably from about 0.01 to about 10 lbs polymer per acre of growing plants, and still more preferably from about 0.5 to about 2 lbs polymer per acre of growing plants. The combined products can likewise be applied as liquid dispersions or as dry granulated products, at the discretion of the user. When polymers in accordance with the present invention are used as a coating, the polymer comprises at least about 0.01% by weight of the coated fertilizer product, more preferably the polymer comprises at least about 5% by weight of the coated fertilizer product, and most preferably comprises at least about 10% by weight of the coated fertilizer product.

Additionally, use of polymers in accordance with the present invention increases the availability of phosphorus and other common fertilizer ingredients and decreases nitrogen volitilization, thereby rendering ambient levels of such plant nutrient available for uptake by growing plants. In such cases, the polymer can be applied as a coating to fertilizer products prior to their introduction into the soil. In turn, plants grown in soil containing such polymers exhibit enhanced growth characteristics.

Another alternative use of polymers in accordance with the present invention includes using the polymer as a seed coating. In such cases, the polymer comprises at least about 0.01% by weight of the coated seed, and more preferably comprises at least about 5% by weight of the coated seed, and still more preferably comprises at least about 10% by weight of the coated seed.

In general, the polymers of the invention are made by free radical polymerization serving to convert selected monomers into the desired polymers with recurring polymeric subunits. Such polymers may be further modified to impart particular structures and/or properties. A variety of techniques can be used for generating free radicals, such as addition of peroxides, hydroperoxides, azo initiators, percarbonate, per-acid, charge transfer complexes, irradiation (e.g., UV, electron beam, X-ray, gamma-radiation and other ionizing radiation types), and combinations of these techniques. Of course, an extensive variety of methods and techniques are well known in the art of polymer chemistry for initiating free-radical polymerizations. Those enumerated herein are but some of the more frequently used methods and techniques. Any suitable technique for performing free-radical polymerization is likely to be useful for the purposes of practicing the present invention.

The polymerization reactions are carried out in a compatible solvent system, namely a system which does not unduly interfere with the desired polymerization, using essentially any desired monomer concentrations. A number of suitable aqueous or non-aqueous solvent systems can be employed, such as ketones, alcohols, esters, ethers, aromatic solvents, water and mixtures thereof. Water alone and the lower ($C_1$–$C_4$) ketones and alcohols are especially preferred, and these may be mixed with water if desired. In most instances, the polymerization reactions are carried out with the substantial exclusion of oxygen, and most usually under an inert gas such as nitrogen or argon. There is no particular criticality in the type of equipment used in the synthesis of the polymers, i.e., stirred tank reactors, continuous stirred tank reactors, plug flow reactors, tube reactors and any combination of the foregoing arranged in series may be employed. A wide range of suitable reaction arrangements are well known to the art of polymerization.

In general, the initial polymerization step is carried out at a temperature of from about 0° C. to about 120° C. (more preferably from about 30° C. to about 95° C. for a period of from about 0.25 hours to about 24 hours and even more preferably from about 0.25 hours to about 5 hours. Usually, the reaction is carried out with continuous stirring.

After the initial polymerization. the products are recovered and hydrolyzed so as to replace at least certain of the ester-containing groups on the polymer with alcohol groups, thereby providing the polymers defined previously. Generally, the hydrolyzing step involves the addition of an acid or base to the polymerized product in the presence of water. Polymers comprising monomers with vinyl ester groups (polymers formed at least in part from A moieties) need to have sufficient base added to neutralize all of the carboxylic acid groups and form a substantial number of alcohol groups from the precursor vinyl ester groups. Thereafter, the completed polymer may be recovered as a liquid dispersion or dried to a solid form. It is important to note that both acid and base hydrolysis are useful in practicing the present invention so that under appropriate conditions, sufficient acid must be added in order to form a substantial number of alcohol groups. Additionally, in many cases it is preferred to react the hydrolyzed polymer with an ion such as Fe, Mn, Mg, Zn, Cu, Ni, Co, Mo, V, Cr, and Ca to form a coordinate metal complex. Techniques for making metal-containing polymer compounds are well known to those skilled in the art. In some of these techniques, a metal's oxide, hydroxide, carbonate, salt, or other similar compound may be reacted with the polymer in acid form. These techniques also include reacting a finely divided free metal with a solution of an acid form of a polymer described or suggested herein. Additionally, the structures of complexes or salts of polymers with metals in general, and transition metals in particular, can be highly variable and difficult to precisely define. Thus, the depictions used herein are for illustrative purposes only and it is contemplated that desired metals or mixtures of such are bonded to the polymer backbone by chemical bonds. Alternatively, the metal may be bonded to other atoms in addition to those shown. For example, in the case of the structure shown herein for the second reactant, there may be additional atoms or functional groups bonded to the Y. These atoms include, but are not limited to, oxygen, sulfur, halogens, etc. and potential functional groups include (but are not limited to) sulfate, hydroxide. etc. It is understood by those skilled in the art of coordination compound chemistry that a broad range of structures may be formed depending upon the preparation protocol, the identity of the metal, the metal's oxidation state, the starting materials, etc. Alternatively, acid hydrolysis may be performed followed by a reaction to form a complex with a previously enumerated metal. In yet another alternative method, the polymer may be isolated and subsequently formulated in such a way that the hydrolysis reaction occurs in situ, in the soil or during mixture with a fertilizing composition. In this alternative method, unhydrolyzed polymer is added to soil or fertilizer compositions of appropriately low or high pH such that when contacted by water, a microenvironment of low or high pH is produced. It is within this microenvironment that hydrolysis occurs and alcohol groups are formed. In the case of Si and B ions, the polymer is merely mixed with these ions and does not form a coordinate complex. However, the availability of these ions to growing plants is increased.

In more detail, the preferred method for polymer synthesis comprises the steps of providing a reaction mixture comprising at least two different reactants selected from the group consisting of first, second, and third reactants. The first reactant is of the general formula

the second reactant is of the general formula

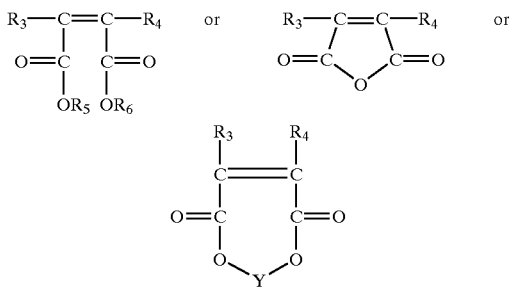

and the third reactant is of the general formula

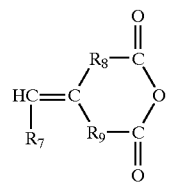

With reference to the above formulae, $R_1$, $R_2$ and $R_7$ are individually and respectively selected from the group consisting of H, OH, $C_1$–$C_{30}$ straight, branched chain and cyclic alkyl or aryl groups, $C_1$–$C_{30}$ straight, branched chain and cyclic alkyl or aryl $C_1$–$C_{30}$ based ester groups (formate ($C_0$), acetate ($C_1$), propionate ($C_2$), butyrate ($C_3$), etc. up to $C_{30}$), R'$CO_2$ groups, and OR' groups, wherein R' is selected from the group consisting of $C_1$–$C_{30}$ straight, branched chain and cyclic alkyl or aryl groups; $R_3$ and $R_4$ are individually and respectively selected from the group consisting of H, $C_1$–$C_{30}$ straight, branched chain and cyclic alkyl or aryl groups; $R_5$, $R_6$, $R_{10}$ and $R_{11}$ are individually and respectively selected from the group consisting of H, the alkali metals, $NH_4$ and the $C_1$–$C_4$ alkyl ammonium groups, Y is selected from the group consisting of Fe, Mn, Mg, Zn, Cu, Ni, Co, Mo, V, Cr, Si, B, and Ca; $R_8$ and $R_9$ are individually and respectively selected from the group consisting of nothing (i.e., the groups are non-existent), $CH_2$, $C_2H_4$, and $C_3H_6$, at least one of said $R_1$, $R_2$, $R_3$ and $R_4$ is OH where said polymeric subunits are made up of A and B moieties, at least one of said $R_1$, $R_2$ and $R_7$ is OH where said polymeric subunits are made up of A and C moieties, and at least one of said $R_1$, $R_2$, $R_3$, $R_4$ and $R_7$ is OH where said polymeric subunits are made up of A, B and C moieties.

Selected monomers and reactants are dispersed in a suitable solvent system and placed in a reactor. The polymerization reaction is then carried out to obtain an initial polymerized product having the described recurring polymeric subunits. Thereupon, the initial polymer product is hydrolyzed to the alcohol form. Put another away, the general reaction proceeds by dissolving monomers (e.g., maleic anhydride and vinyl acetate) in a solvent (e.g., acetone). The amount of monomers incorporated can be either equimolar or non-equimolar. A free radical initiator is then introduced and copolymerization takes place in solution. After the reaction is complete and substantially all monomer has been reacted, the resulting solution is a maleic anhydride-vinyl acetate copolymer. Of course, if all monomers have not undergone polymerization, the resulting solution will contain a small portion of monomers which do not affect later use of the polymer. The solution is concentrated and subjected to hydrolysis (either in situ or by performing a hydrolysis reaction during manufacture) with a sufficient amount of base (e.g., NaOH) in the presence of water. This base neutralizes a substantial majority of the carboxylic acid groups and converts a substantial majority of the polymer's acetate groups into alcohol groups. The anhydride groups are converted to carboxylic acid sodium salt groups arranged in groups of two on the backbone of the polymer. The resulting copolymer is then isolated by conventional methods such as precipitation.

Again, it is important to note that the aforementioned methods and procedures are merely preferred methods of practicing the present invention and those skilled in the art understand that a large number of variations and broadly analogous procedures can be carried out using the teachings contained herein. For example, acid hydrolysis can also be used followed optionally by formation of various derivatives or the hydrolysis may be carried out naturally in soil under sufficient moisture and pH conditions. The acid hydrolysis isolates the polymers of the present invention in a substantially acid form which renders them highly versatile and useful. These polymers may be used as is (in the acid form) or further reacted with various materials to make salts and/or complexes. Furthermore, complexes or salts with various metals may be formed by reacting the acid form with various oxides, hydroxides, carbonates, and free metals under suitable conditions. Such reactions are well known in the art and include (but are not limited to) various techniques of reagent mixing, monomer and/or solvent feed, etc. One possible technique would be gradual or stepwise addition of an initiator to a reaction in progress. Other potential techniques include the addition of chain transfer agents, free radical initiator activators, molecular weight moderators/control agents, use of multiple initiators, initiator quenchers, inhibitors, etc. Of course, this list is not comprehensive but merely serves to demonstrate that there are a wide variety of techniques available to those skilled in the art and that all such techniques are embraced by the present invention.

Another alternative method involves taking an aqueous solution of, for example, caustic and stirring it in a suitable container. Next, an acetone reaction mixture containing, for example, acetone and a copolymer of maleic anhydride with vinyl acetate is added to the caustic solution. Throughout this addition, the polymer going into the caustic solution will experience a high pH and have the acetate groups hydrolyzed to the alcohol form. In acid-base titrations such as this, at the point where one reagent is just exhausted, a very sharp pH change usually takes place with minimal addition of the second reagent. Therefore, in this reaction, just enough acetone-polymer reaction solution is added to bring the apparent pH of the now final polymer product-acetone-water mixture to about 7. At this time, the mixture is subjected to reduced pressure distillation to remove acetone. The result is an aqueous solution at a neutral pH that contains the desired polymer. From this solution, it may be isolated by a variety of ways, including but not limited to precipitation, spray drying, simple drying, and etc. The only side effect of a reaction of this type is that a small fraction of the polymer is going to contain acetate groups which are not hydrolyzed to alcohol.

The foregoing description is useful in instances where polymers in accordance with the present invention, upon dissolution in water, give a solution that is alkaline. In many cases, this alkalinity is not a problem as the solution pH can be adjusted to neutral or acidic with a suitable mineral or organic acid. However, the formulation of this powder into some liquid formulations containing metals is problematic. High-pH solutions of metal salts tend to form insoluble metal hydroxides that precipitate and/or exhibit other behaviors that are undesirable from the point of view of formulation ease and convenience, as well as nutrient availability. One way to remedy this problem, other than as described in the preceding paragraph, is to add a mineral or organic acid to the aqueous solution of polymer salt in order to bring the pH close to neutral.

DETAILED DESCRIPTION OF THE PREFERRED EMBODIMENTS

The following examples set forth techniques for the synthesis of polymers in accordance with the invention, and various uses thereof. It is to be understood that these examples are provided by way of illustration only and nothing therein should be taken as a limitation upon the overall scope of the invention.

EXAMPLE 1

Acetone (111 ml), maleic anhydride (20 g), vinyl acetate monomer (19 ml), and the radical source initiator di-tertbutyl peroxide (2.4 ml) were stirred together under inert gas (such as nitrogen or argon) in a reactor. The reactor provided included a suitably sized glass spherical flask equipped with a magnetic stirrer, an inert gas inlet, a contents temperature measurement device in contact with the contents of the flask, and a removable reflux condenser. This combination of materials was heated in a hot water bath with stirring at an internal temperature of about 70° C. for five hours. At that point, the contents of the flask were evaporated (by removing the condenser with continued heating) to a thick oil, and 100 ml of water was added. Then, 18 g of granular sodium hydroxide (NaOH) was added to the above dispersion. The resulting mixture was heated again to about 100° C. and allowed to reflux for about two hours. The mixture was then allowed to evaporate by removal of the condenser to a slightly viscous mass. This mass was precipitated by adding the evaporated mixture to about 0.5 liters of ethanol while stirring was continued. The solids were recovered and then dried. The resulting product was a white-colored powder. These reactions proceeded as follows:

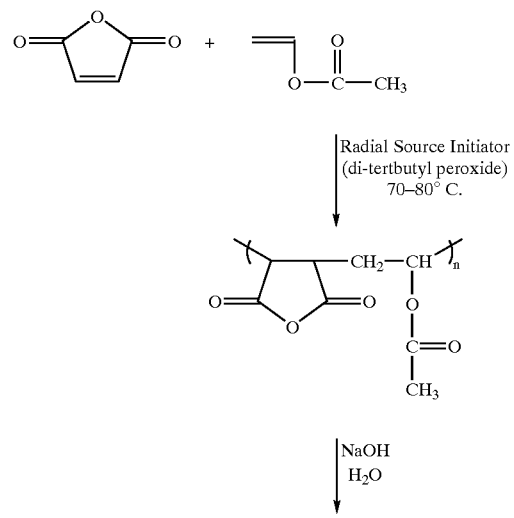

-continued

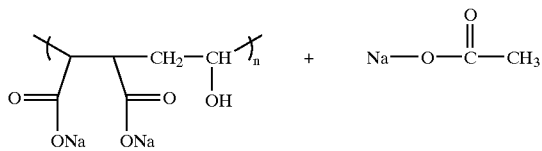

EXAMPLE 2

This reaction was carried out similarly to that of Example 1. However, in this case the following quantities of ingredients were used: acetone (50 ml), maleic anhydride (44 g), vinyl acetate monomer (42 ml), and di-tertbutyl peroxide (8.3 ml). This mixture was heated in a hot water bath with stirring at an internal temperature of about 70° C. for five hours. The contents of the reactor flask were then evaporated to a thick oil and 100 ml of water was added. Next, 57 g granular NaOH was added. This mixture was heated again to about 100° C. and allowed to reflux for about one hour. After refluxing, the mixture evaporated to a slightly viscous mass. This mass was precipitated by adding it, with stirring to 0.9 liters of ethanol. The solids were then recovered and dried. The resulting product was a tan-colored powder.

EXAMPLE 3

This reaction was also carried out as in Example 1. However, the following quantities of ingredients were used: acetone (273.0 ml), maleic anhydride (49 g), vinyl acetate monomer (46 ml), and di-tertbutyl peroxide (5.9 ml). This mixture was heated in a hot water bath with stirring at an internal temperature of about 70° C. for five hours. The contents of the flask were then evaporated into a thick oil (once again by removing the condenser), and 250 ml of water was added. Following the water addition, 63 g of granular NaOH was added. The resulting mixture was heated to about 100° C. again, and allowed to reflux for about one hour. This mixture was then evaporated to a slightly viscous mass. The mass was precipitated with stirring into about 2 liters of ethanol. Solids were recovered and dried and the product was a very bright white powder.

EXAMPLE 4

In this example, copper was complexed with the polymer isolated in Example 1. Five grams of the Example 1 polymer was mixed with 50 g (dry weight) of ion exchange resin (strong acid macro reticular, 4.9 meq/gram dry) which had been soaked in water until the mixture was fluid. The acid form of the polymer was then washed out with several aliquots of water. The resultant water-polymer mixture was then mixed with 6 g of $CuSO_4$ pentahydrate. The aqueous solution containing the copper complex was then evaporated to dryness and the material was collected.

EXAMPLE 5

One gram of the polymer prepared and isolated in Example 1 was dissolved into 20 ml of room temperature water. 1.3 g sodium bisulfate was added to this dispersion with stirring. While stirring was continued, 0.5 g of ferric sulfate $(Fe_2(SO_4)_3)$ tetrahydrate was added slowly with stirring. This product was isolated by evaporating the water from the solution to dryness. Thereafter, the isolated dry material was collected. The resultant product was an iron complex of the polymer of Example 1.

EXAMPLE 6

In this example, 1 g of the polymer prepared and isolated in Example 1 was added to 20 ml of room temperature water. Sulfuric acid (98%) was added to the dispersion with stirring, until the pH dropped to about 2. 1.5 g of manganese dichloride tetrahydrate was added slowly to the dispersion with vigorous stirring. The material (a manganese complex of the Example 1 polymer) was then evaporated to dryness and the material was collected.

EXAMPLE 7

Five grams of the polymer prepared and isolated in Example 1 was dissolved in 100 ml of water. Sulfuric acid (98%) was added until the pH dropped to about 2. 7 g of zinc sulfate heptahydrate was added slowly with vigorous stirring to the dispersion. The resulting solution had the product (a zinc complex of the Example 1 polymer) isolated by evaporating the water to dryness and was collected thereafter.

EXAMPLE 8

Water (30 g), and maleic anhydride (20 g) is put into the reactor with stirring under inert gas, such as nitrogen or argon. During this time, the anhydride is converted to the acid form. Di-tertbutyl peroxide (2.4 ml) is added to the flask. The resulting mixture is heated and refluxed until the reflux head temperature gradually rises to about 100° C. At this point, vinyl acetate monomer (19 ml) is gradually added to the reaction at about the same rate that it is consumed. The reaction is carried out until substantially all monomer is consumed. The product of this synthesis is then hydrolyzed as in Example 1. This example demonstrates that the preferred polymerization may be carried out in an aqueous medium.

EXAMPLE 9

The product of the reaction described in Example 8 is refluxed overnight at about 100° C. and then subjected to a short-path distillation under inert atmosphere in order to remove the acetic acid hydrolysis product. Due to the high temperature and high product concentration, lactone formation is minimized, and the fraction of dicarboxylic acid functional groups that are available is maximized. The desired product is isolated by spray-drying the aqueous solution to give a white amorphous powder.

EXAMPLE 10

This example is similar to that described in Example 8; however, water is replaced with a 1:1 (w/w) mixture of water and ethanol. 20 g of maleic anhydride is added to this mixture. Next, di-tertbutyl peroxide (2.4 ml) is added to the reactor and the resulting mixture is heated to reflux until the reflux head temperature rises to about 100° C. Vinyl acetate monomer is then gradually added to the reaction at about the same rate it is consumed. Once again, 19 ml of vinyl acetate monomer is used. The reaction is carried out until substantially all of the monomer is consumed. The resulting product is then refluxed overnight and subjected to a short-path distillation under inert atmosphere in order to remove the acetic acid hydrolysis product. Once again, due to the high temperature and high product concentration, lactone formation is minimized and the fraction of dicarboxylic acid functional groups is maximized. The desired product is then isolated by spray-drying the aqueous solution to give a white amorphous powder.

EXAMPLE 11

This Example demonstrates that the polymerization may be carried out using UV free radical initiation instead of peroxide. Water (30 g) and maleic anhydride (20 g) is mixed in the reactor under inert gas. A 10 watt lamp emitting UV radiation at the 190–210 nm wavelength range is immersed in the reaction vessel. The mixture is heated to reflux until the reflux head temperature gradually rises to about 100° C., at which point 19 ml of vinyl acetate monomer is gradually added to the reaction at about the same rate as it is consumed. The reaction is carried out until substantially all of the monomer is consumed. Once synthesis (copolymerization) is substantially complete, the resultant product is hydrolyzed as in Example 1.

EXAMPLE 12

In this example, polymerization is carried out using UV free radical initiation in a mixture of organic solvent and water. The experiment is carried out as in Example 11, but water is replaced with a 1:1 (w/w) mixture of water and ethanol. The isolation and hydrolysis procedures are substantially the same as those used in Examples 8 and 9.

EXAMPLE 13

In this example, the procedure of Example 8 is carried out except that 1 ml of hydrogen peroxide (30% w/w) is used instead of di-tertbutyl peroxide.

EXAMPLE 14

This example demonstrates acid hydrolysis in an aqueous medium. To the product of the reaction described in Example 8, 0.2 g 98% of sulfuric acid is added and the mixture is refluxed overnight at about 100° C. Next, the mixture is subjected to a short-path distillation under inert gas to remove the acetic acid hydrolysis product. Due to the acidity, high temperature and high product concentration, lactone formation is minimized, and the fraction of dicarboxylic acid functional groups is maximized. The product is isolated by spray drying the aqueous solution to give a white amorphous powder.

EXAMPLE 15

An aqueous solution composed of 40 g water, 11.6 g maleic acid and 8.1 g zinc oxide is formed. The oxide slowly reacts and dissolves to give zinc maleate derivative solution. This is used as a monomer source in a polymerization such as that described in Example 8 where equimolar amounts of maleate and vinyl acetate were used. After that, a hydrolysis is performed using the procedures described in Example 14. The reaction proceeded as follows:

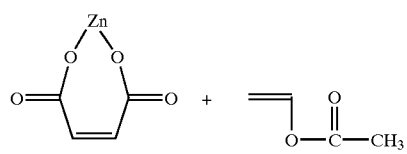

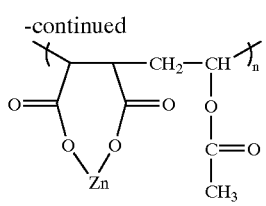

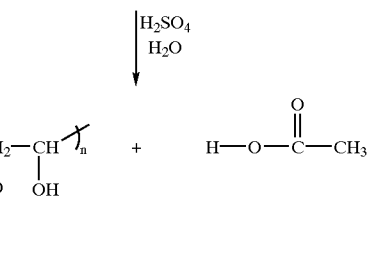

EXAMPLE 16

An aqueous solution composed of 40 g water, 11.6 g maleic acid, and 11.5 g manganese carbonate is prepared. The carbonate slowly reacts and dissolves to give manganese maleate derivative solution. This manganese maleate solution is used as a monomer source in a polymerization such as that described in Example 8, wherein equimolar amounts of maleate and vinyl acetate were used. After that, a hydrolysis is performed using the procedures described in Example 14. The reaction proceeded as follows:

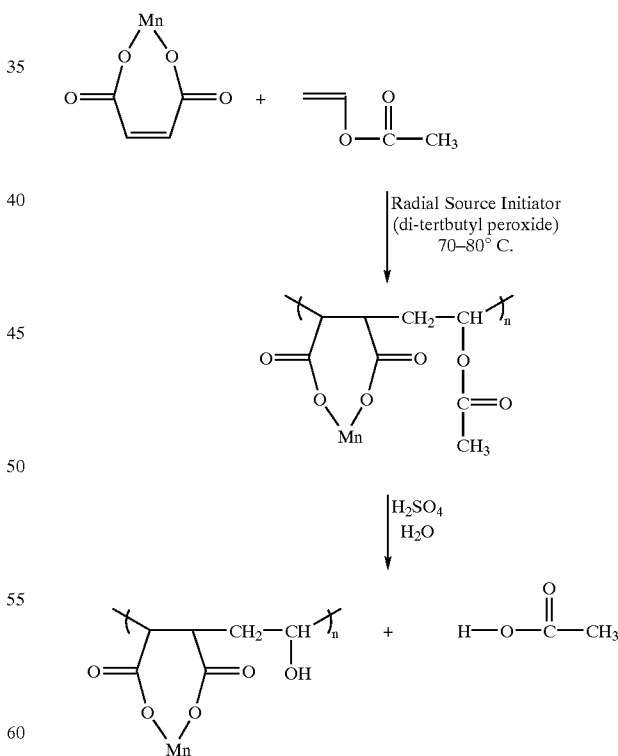

EXAMPLE 17

An aqueous solution composed of 40 g water, 11. g maleic acid, and 5.6 g very fine iron dust is formed. The metal slowly reacts and dissolves to give iron maleate derivative solution. This solution is used as a monomer source in a polymerization reaction such as that described in Example 8, wherein equimolar amounts of maleate and vinyl acetate were used. After that, a hydrolysis is performed using the procedures described in Example 14. This reaction proceeded as follows:

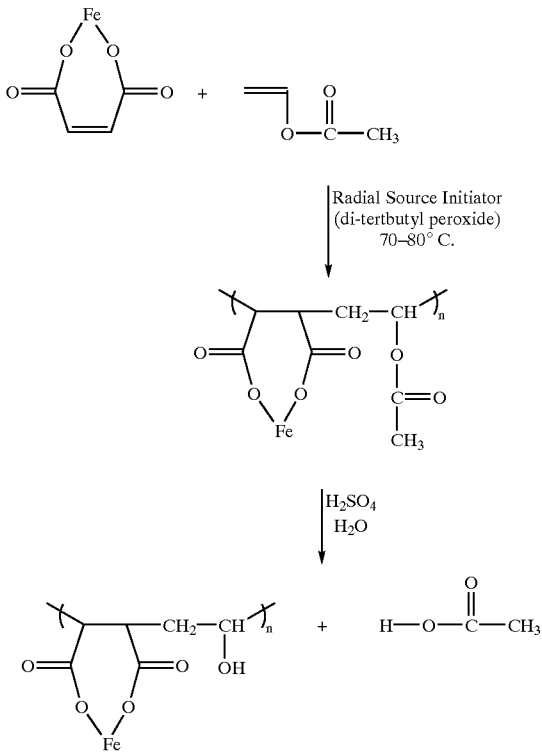

EXAMPLE 18

A continuous reactor is provided including an in-line motionless tube mixer, pumps, thermostatted tubes, and associated valves, fittings, and controls. Maleic anhydride (50% w/w in acetone), vinyl acetate and di-tertbutyl peroxide are pumped into the in-line tube mixer and then into the thermostatted tube. The mixture's residence time in the tube is about 3 hours. The tube temperature is about 70° C. The flow rates are: maleic anhydride solution—100 g/min; vinyl acetate—43 g/min; and di-tertbutyl peroxide—3 g/min. Hydrolysis is performed using the procedures described in Example 14.

EXAMPLE 19

Aqueous dispersions containing 10, 50 and 100 ppm of the copper, manganese and zinc copolymers formed in Examples 4, 6 and 7 were applied to the foliage of plum, maple and sweetgum trees, respectively, in order to obtain substantially uniform foliage coverage. Prior to this application, the trees visually exhibited characteristic deficiency symptoms for each of the three micronutrients. This treatment alleviated the visual symptoms of the micronutrient deficiency in about 7–10 days.

EXAMPLE 20

Bluegrass was treated with aqueous dispersions of the iron copolymer from Example 5 (20, 50 and 100 ppm concentrations of iron copolymer) and compared to an untreated control which received no iron copolymer. These foliar iron treatments were applied at three different times as pretreatments before bluegrass was harvested. Photos of the plants were taken two weeks after the last treatment. The results (Table 1) clearly show that the bluegrass responded to the iron copolymer application. The total harvest weights for each of the three iron copolymer bluegrass test groups were at least twice that of the control bluegrass. As the amount of copolymer applied increased, harvest weight also increased.

TABLE 1

Bluegrass Response to Varying Concentrations of Fe Copolymer

| | Harvest Wts (g) Fe Copolymer Concentration Applied | | | |
|---|---|---|---|---|
| Harvest | 0 ppm | 25 ppm | 50 ppm | 100 ppm |
| 1 | 0.3 | 1.6 | 1.8 | 2.1 |
| 2 | 1.8 | 2.9 | 2.1 | 2.0 |
| 3 | 1.4 | 2.5 | 3.6 | 3.9 |
| Total | 3.5 | 7.0 | 7.5 | 8.0 |

EXAMPLE 21

In this example, the effect of iron copolymer treatment on Lisintus was determined. The iron copolymer of Example 5 was used for this experiment. The first control group of plants received no iron copolymer treatment, the second group was foliarly treated with an aqueous dispersion containing 50 ppm of the iron copolymer on three different occasions before harvest, and the third group was similarly treated with an aqueous dispersion containing 100 ppm iron copolymer three times before harvest; The Lisintus was harvested and analyzed (by digestion followed by atomic absorption spectroscopy) for iron concentration, and by SPAD meter to determine photosynthetically active chlorophyl levels. The results of this experiment are given in Table 2 which shows that application of iron copolymer resulted in a higher iron concentration in the Lisintus leaves. However, the amount of iron copolymer applied to the Lisintus did not have an appreciable effect on ultimate iron concentration (i.e. SPAD meter readings between Lisintus treated with 50 ppm iron copolymer and 100 ppm iron copolymer did not differ significantly). Therefore, the most efficient treatment may occur at levels below 50 ppm.

TABLE 2

Iron Concentration and SPAD Meter Readings of Lisintus Leaves Treated with Foliar Applications of Iron Copolymer

| Treatment | Fe Uptake (ppm) | SPAD Meter Readings |
|---|---|---|
| Control | 146 | 29.5 |
| 50 ppm | 276 | 63.7 |
| 100 ppm | 309 | 64.1 |

EXAMPLE 22

In this experiment, different amounts of the copolymer formed in Example 1 were used in conjunction with phosphate fertilizer in soil, in order to test the effect of using the polymer with the fertilizer. In particular, the test was conducted on ryegrass grown in growth bags. The growth bags contained soil, water and a conventional, commercially available 8-14-9 N P K liquid fertilizer. One growth bag (the control) had no copolymer added. One bag labeled 0.5X was treated with a fertilizer mixture containing 25 ppm of the copolymer (the copolymer was added to the liquid fertilizer prior to addition thereof to the growth bags). The bag labeled 1X was treated with a liquid fertilizer mixture containing 50 ppm of copolymer. The fertilizer solution in the growth bags were replenished uniformly on an as-needed basis. After the grass was harvested, it was dried and weighed. Results of this experiment are given in Table 3 which shows no response to the 0.5X copolymer application. The 1X copolymer application resulted in a 25% increase in dry weight.

TABLE 3

Effects of Copolymer with Liquid Fertilizer on Resulting Plant Growth

| Treatment | Average Shoot Weight |
|---|---|
| 1X Copolymer and Liquid Fertilizer | 33.0 |
| .5X Copolymer and Liquid Fertilizer | 25.0 |
| Control - Liquid Fertilizer Only | 24.9 |

EXAMPLE 23

In this test, the copolymer from Example 1 was tested with phosphate fertilizers in high phosphate-fixing soils in corn growth tests. The test was designed to determine the effect of the copolymer on the plant availability of phosphate based fertilizer in the soil. For this experiment, monoammonium phosphate (MAP) was tested although it is understood that similar results would occur with any phosphate based fertilizer.

Two soils were utilized in the study, an acid soil (pH 4.5–4.7) from Sedgewick County, Kans. and a calcareous soil (pH 8.0–8.3) from the vicinity of Tribune, Kans. The acid soil is high in available P but owing to the high exchangeable Al and Fe content of the soil, P availability is limited. The calcareous soil was lower in available P.

Containers (flats) approximately 75 cm×40 cm were used for the study. These flats held approximately 8 kg of soil filled to a depth of approximately of 7.5 cm, and allows planting in rows with band placement of the fertilizer material, beside the row or in seed contact if desired. Multiple rows within each container were used as replications. The containers served as individual treatment for each crop and were rotated to eliminate any possible variables of light and/or temperature.

Corn was used as the test crop. The seeds were planted in rows, thinned to a constant population per row. Only a single variety of corn was used for each crop. Corn was taken to approximately the 6-leaf stage before the whole plant was harvested for dry weight and plant composition analysis. In the corn test, four plants per row per replication were used, thinned back from ten plants.

Conventional Cargill MAP fertilizer was used, with the fertilizer being coated with the copolymer product of Example 1 at rates of 1 g copolymer/100 g MAP (P1X) and 2 g copolymer/100 g MAP (P2X). The MAP particles were sized prior to copolymer application to insure that the individual particles were of approximately the same size. In all instances, a single rate of application of 20 ppm phosphorus calculated as $P_2O_5$ was employed. In addition, a no-phosphorus control was also included in the study for each crop on each soil. Other nutrients were supplied at constant rates.

The fertilizer-copolymer MAP product was applied in a banded fashion with a constant number of phosphate material particles utilized per row (63 particles per each 10 inch row section). This procedure placed the experimental products close to the rows for maximum availability in the phosphate-fixing conditions, and allowed comparison of the effect of the copolymer with each phosphorus fertilizer.

After harvesting, the plants were tested for dry weight, phosphorus concentration and phosphorus uptake. SAS was utilized to analyze variance of the data.

TABLE 4

Phosphorus Materials Evaluation - Corn

| Material | Dry Wt. (g) | P. Concentration (%) | P Uptake |
|---|---|---|---|
| Control | 5.18 | 0.827 | 43.2 |
| P1X | 8.90 | 0.996 | 88.7 |
| P2X | 9.55 | 1.043 | 99.6 |
| $LSD_{.05}$ | 2.47 | 0.177 | 31.8 |

EXAMPLE 24

In this test, the effects of polymers on nitrogen volitilization was tested. A urea was sized by screening to a uniform size and was treated to form a 5% by weight coating of a polymer in accordance with the present invention. The coating was prepared by solubilizing 5 grams of polymer in 3 ml of water. The mixture was then added uniformly to 95 g of urea. To the mixture, 7 g of clay was added which dried the mixture and provided a clay coating. The mixture was then applied to soil for comparison. There were two polymers tested, one which was 50% calcium and 50% hydrogen saturated and the other which was 100% calcium saturated. Each of these polymer mixtures were compared to an untreated urea. Soil samples were taken and cumulative nitrogen losses were determined after 16 days.

As shown in Table 5, coating the urea with clay or a polymer and clay combination greatly reduced nitrogen volatilization. Untreated urea lost 37.4% of its total nitrogen. The polymers, calcium/hydrogen mixtures and calcium alone, lost only 20.6% and 19.5% respectively. Unexpectedly, the polymer combination significantly reduced nitrogen volatilization.

TABLE 5

Ammonia Loss as a Percentage of Total Nitrogen Applied

| Treatment | Replicate 1 | Replicate 2 | Replicate 3 | Average |
|---|---|---|---|---|
| Urea | 33.3 | 41.3 | 37.7 | 37.4 |
| Urea/Clay/5% Polymer 50% H, 50% Ca saturated | 19.0 | 19.3 | 23.7 | 20.6 |
| Urea/Clay/5% Polymer 100% Ca saturated | 17.1 | 21.7 | 19.5 | 19.5 |

EXAMPLE 25

This experiment determined the effects of polymers in accordance with the invention on phosphorus fertilizer availability. An acid soil (pH 4.7) and a calcareous soil (pH 7.8) treated as in Example 23 were collected. These soils were chosen for their P fixing characteristics, preformed by Fe and Al in the acid soil and Ca in the calcareous soil. All treatments involved four replication. Soil samples were collected from the area of banded P beside the corn row after the plants had been harvested. The phoshporus material was MAP (although it is understood that all fertilizers should have similar results) with and without an experimental coating of 1.0% on the exterior of the MAP particles. The coating was prepared using the procedures described above in Example 24. Phosphorus rates were 5, 10 and 20 ppm P2O5 banded beside the seed (1 inch to the side, 1 inch below) of corn in flats containing 7 kilograms of soil. Composited cores from each treatment were processed and analyzed using conventional testing procedures. A single weak acid extractant (Bray P-1) was utilized for both the acid and calcareous soils. The P fertilizer had been in contact with the soil for approximately 5 weeks at the time of sampling.

Results of this experiment are given below in Table 6. Coating MAP with the experimental product produced consistently higher soil test P values indicating that the extractability of the P was increased. Therefore, normal soil P fixation had not progressed as rapidly in the presence of the polymer. The results from the acid soil displayed more differentiation that those of the calcareous soil, perhaps due to the tendency of the weak Bray extractant to react with free calcium carbonate in the calcareous soil. Plant growth data also demonstrated similar indications of greater P availability.

Thus, polymers in accordance with the present invention have significant effects on P availability from ammonium phosphate fertilizers. Furthermore, these polymers may be of substantial value in improving P use efficiency from applied fertilizers on both acid and calcareous soils with P fixation capacities.

TABLE 6

Polymer Effects on Soil Test P

| Treatment | Soil Bray-1 P Concentrations ppm P |
|---|---|
| No P Control, Acid Soil | 76 |
| 5 ppm P2O5, MAP Control, Acid Soil | 121 |
| 10 ppm P2O5, MAP Control, Acid Soil | 117 |
| 20 ppm P2O5, MAP Control, Acid Soil | 151 |
| 5 ppm P2O5, MAP Experimental, Acid Soil | 195 |
| 10 ppm P2O5, MAP Experimental, Acid Soil | 190 |
| 20 ppm P2O5, MAP Experimental, Acid Soil | 220 |
| LSD 0.10, Acid Soil | 26 |
| No P Control, Calcareous Soil | 76 |
| 5 ppm P2O5, MAP Control, Calcareous Soil | 96 |
| 10 ppm P2O5, MAP Control, Calcareous Soil | 110 |
| 20 ppm P2O5, MAP Control, Calcareous Soil | 156 |
| 5 ppm P2O5, MAP Experimental, Calcareous Soil | 164 |
| 10 ppm P2O5, MAP Experimental, Calcareous Soil | 159 |
| 20 ppm P2O5, MAP Experimental, Calcareous Soil | 102 |
| LSD 0.10 Calcareous Soil | 38 |

We claim:

1. A fertilizer product comprising particles of a fertilizer in intimate contact with a polymer, said polymer comprising recurring polymeric subunits each made up of at least two different moieties individually and respectively taken from the group consisting of A, B, and C moieties, or recurring C moieties, wherein moiety A is of the general formula

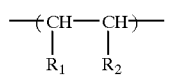

moiety B is of the general formula

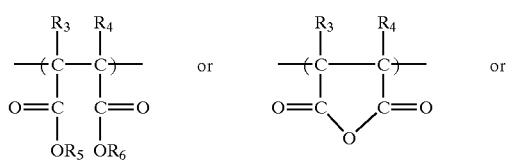

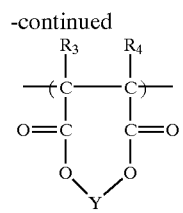

and moiety C is of the general formula

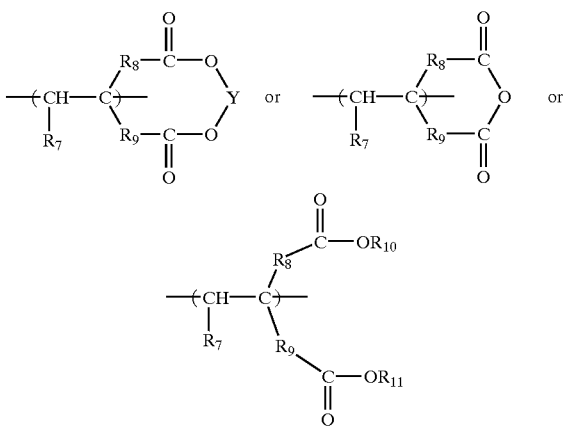

wherein $R_1$, $R_2$ and $R_7$ are individually and respectively selected from the group consisting of H, OH, $C_1$–$C_{30}$ straight, branched chain and cyclic alkyl or aryl groups, $C_1$–$C_{30}$ straight, branched chain and cyclic alkyl or aryl $C_1$–$C_{30}$ based ester groups, R'CO$_2$ groups, and OR' groups, wherein R' is selected from the group consisting of $C_1$–$C_{30}$ straight, branched chain and cyclic alkyl or aryl groups; $R_3$ and $R_4$ are individually and respectively selected from the group consisting of H, $C_1$–$C_{30}$ straight, branched chain and cyclic alkyl or aryl groups; $R_5$, $R_6$, $R_{10}$ and $R_{11}$ are individually and respectively selected from the group consisting of H, the alkali metals, NH$_4$ and the $C_1$–$C_4$ alkyl ammonium groups, Y is selected from the group consisting of Fe, Mn, Mg, Zn, Cu, Ni, Co, Mo, V, Cr, Si, B, and Ca; $R_8$ and $R_9$ are individually and respectively selected from the group consisting of nothing, CH$_2$, C$_2$H$_4$, and C$_3$H$_6$, at least one of said $R_1$, $R_2$, $R_3$ and $R_4$ is OH where said polymeric subunits are made up of A and B moieties, at least one of said $R_1$, $R_2$ and $R_7$ is OH where said polymeric subunits are made up of A and C moieties, and at least one of said R, $R_2$, $R_3$, $R_4$ and $R_7$ is OH where said polymeric subunits are made up of A, B and C moieties.

2. The fertilizer product of claim 1, said fertilizer being selected from the group consisting of phosphate-based fertilizers, fertilizers containing nitrogen, phosphorous, potassium calcium, magnesium, sulfur, boron, or molybdenum materials, fertilizers containing micronutrients, and oxides, sulfates, chlorides, and chelates of such micronutrients.

3. The fertilizer product of claim 1, said polymer and fertilizer being co-ground together.

4. The fertilizer product of claim 1, said polymer being applied to the surface of said fertilizer.

5. The fertilizer product of claim 1, said fertilizer being in the form of particles having an average diameter from about powder size to about 10 cm.

6. The fertilizer product of claim 1, said polymer being present in said fertilizer product at a level of from about 0.001 g to about 20 g polymer per 100 g fertilizer.

7. The fertilizer product of claim 1, said polymer being complexed with an ion.

8. The fertilizer product of claim 7, said ion being selected from the group consisting of Fe, Mn, Mg, Zn, Cu, Ni, Co, Mo, V, Cr, Si, B, and Ca.

9. A composition for-enhancing the growth of plants comprising a dicarboxylic acid polymer and a fertilizer product, said dicarboxylic acid polymer comprising recurring polymeric subunits each made lip of at least two different moieties individually and respectively taken from the group consisting of A, B, and C moieties, or recurring C moiety, wherein moiety A is of the general formula

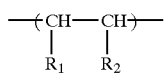

moiety B is of the general formula

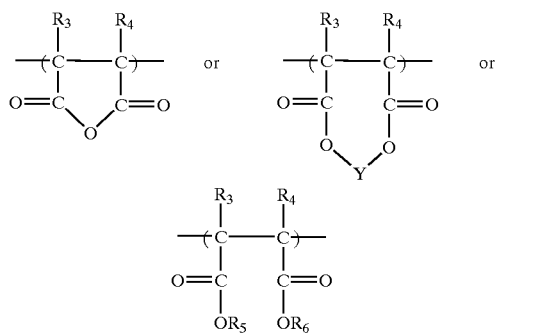

and moiety C is of the general formula

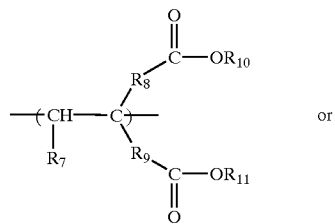

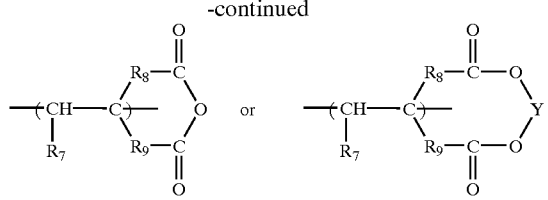

wherein $R_1$, $R_2$ and $R_7$ are individually and respectively selected from the group consisting of H, OH, $C_1$–$C_{30}$ straight, branched chain and cyclic alkyl or aryl groups, $C_1$–$C_{30}$ straight, branched chain and cyclic alkyl or aryl $C_1$–$C_{30}$ based ester groups, $R'CO_2$ groups, and $OR'$ groups, wherein $R'$ is selected from the group consisting of $C_1$–$C_{30}$ straight, branched chain and cyclic alkyl or aryl groups; $R_3$ and $R_4$ are individually and respectively selected from the group consisting of H, $C_1$–$C_{30}$ straight, branched chain and cyclic alkyl or aryl groups; $R_5$, $R_6$, $R_{10}$ and $R_{11}$ are individually and respectively selected from the group consisting of H, the alkali metals, $NH_4$ and the $C_1$–$C_4$ alkyl ammonium groups, Y is selected from the group consisting of Fe, Mn, Mg, Zn, Cu, Ni, Co, Mo, V, Cr, Si, B, and Ca; $R_8$ and $R_9$ are individually and respectively selected from the group consisting of nothing, $CH_2$, $C_2H_4$, and $C_3H_6$, at least one of said $R_1$, $R_2$, $R_3$ and $R_4$ is OH where said polymeric subunits are made up of A and B moieties, at least one of said $R_1$, $R_2$ and $R_7$ is OH where said polymeric subunits are made up of A and C moieties, and at least one of said $R_1$, $R_2$, $R_3$, $R_4$ and $R_7$ is OH where said polymeric subunits are made up of A, B and C moieties.

10. The composition of claim 9, said fertilizer product being selected from the group consisting of phosphate-based fertilizers, fertilizers containing nitrogen, phosphorous, potassium calcium, magnesium, sulfur, boron, or molybdenum materials, fertilizers containing micronutrients, and oxides, sulfates, chlorides, and chelates of such micronutrients.

* * * * *

UNITED STATES PATENT AND TRADEMARK OFFICE
CERTIFICATE OF CORRECTION

PATENT NO.    : 6,525,155 B2
DATED         : February 25, 2003
INVENTOR(S)   : John Larry Sanders, James Michael Kimmerly and Grigory Mazo It is certified that error appears in the above-identified patent and that said Letters Patent is hereby corrected as shown below:

<u>Column 21,</u>
Line 7, the word "lip" is hereby deleted and the word -- up -- has been inserted in lieu thereof.

Signed and Sealed this

Third Day of February, 2004

JON W. DUDAS
*Acting Director of the United States Patent and Trademark Office*